United States Patent
Dohi

(10) Patent No.: US 9,625,694 B2
(45) Date of Patent: Apr. 18, 2017

(54) SCANNING OPTICAL SYSTEM AND SCANNING DEVICE

(71) Applicant: OLYMPUS CORPORATION, Hachioji-shi, Tokyo (JP)

(72) Inventor: Masahito Dohi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/155,965

(22) Filed: May 16, 2016

(65) Prior Publication Data

US 2016/0349494 A1    Dec. 1, 2016

(30) Foreign Application Priority Data

May 29, 2015 (JP) ................................ 2015-110115

(51) Int. Cl.
  *G02B 26/08*    (2006.01)
  *G02B 21/00*    (2006.01)
  (Continued)

(52) U.S. Cl.
  CPC ....... *G02B 21/0048* (2013.01); *G02B 5/3083* (2013.01); *G02B 21/002* (2013.01);
  (Continued)

(58) Field of Classification Search
  CPC  G02B 21/002; G02B 26/105; G02B 21/0048; G02B 5/3083; G02B 21/0076; G02B 26/101; G02B 27/283
  (Continued)

(56) References Cited

U.S. PATENT DOCUMENTS 6,631,226 B1* 10/2003 Schoeppe ............ G02B 21/002
  385/33
8,294,985 B2  10/2012 Sasaki et al.
  (Continued)

FOREIGN PATENT DOCUMENTS

| JP | 2010085826 A | 4/2010 |
| JP | 2010091694 A | 4/2010 |
| JP | 2013020144 A | 1/2013 |

OTHER PUBLICATIONS

Extended European Search Report (EESR) dated Oct. 31, 2016 issued in counterpart European Application No. 16170121.4.

*Primary Examiner* — Euncha Cherry
(74) *Attorney, Agent, or Firm* — Holtz, Holtz & Volek PC

(57) ABSTRACT

For achieving an expanded observation range without sacrificing resolution, a scanning optical system according to the present invention includes a scanner that deflects laser light from a light source while changing a deflection angle of the laser light; a polarization beam splitter that is capable of splitting-off the laser light from an optical path of the laser light deflected by the scanner; a polarization beam splitter that is disposed between the light source and the scanner and that causes the laser light split-off by the polarization beam splitter to travel toward the scanner; and a first relay optical system that has 1× relay magnifying power and that is disposed between the polarization beam splitter and the polarization beam splitter. The first relay optical system relays the laser light split-off by the polarization beam splitter so as to cause the laser light to be incident again on the scanner at the same position as an incident position of the laser light from the light source via the polarization beam splitter.

7 Claims, 8 Drawing Sheets

(51) Int. Cl.
*G02B 26/10* (2006.01)
*G02B 5/30* (2006.01)
*G02B 27/28* (2006.01)

(52) U.S. Cl.
CPC ..... *G02B 21/0032* (2013.01); *G02B 21/0076* (2013.01); *G02B 26/101* (2013.01); *G02B 26/105* (2013.01); *G02B 27/283* (2013.01)

(58) Field of Classification Search
USPC .................................................. 359/201.2
See application file for complete search history.

(56) References Cited

U.S. PATENT DOCUMENTS

| | | |
|---|---|---|
| 2013/0301096 A1 | 11/2013 | Takahashi |
| 2014/0146376 A1 | 5/2014 | Kleppe et al. |

\* cited by examiner

SCANNING OPTICAL SYSTEM AND SCANNING DEVICE

CROSS-REFERENCE TO RELATED APPLICATIONS

This application is based on Japanese Patent Application No. 2015-110115, the contents of which are incorporated herein by reference.

TECHNICAL FIELD

The present invention relates to scanning optical systems and scanning devices.

BACKGROUND ART

In the related art, a known microscope apparatus scans pulsed laser light from a light source by using a scanner, relays the pulsed laser light by using a relay lens, and focuses the pulsed laser light onto a sample by using an objective lens so that fluorescence generated in accordance with a multiphoton excitation effect can be observed (for example, see Patent Literature 1).

In order to observe a large sample in high resolution with this microscope apparatus in Patent Literature 1, it is necessary to attach a low-magnifying-power objective lens with a wide actual field of view to the microscope apparatus and to increase the beam diameter of the laser light entering the objective lens.

CITATION LIST

Patent Literature

{PTL 1}
Japanese Unexamined Patent Application, Publication No. 2010-85826

SUMMARY OF INVENTION

In a microscope apparatus provided with a scanner that uses a galvanometer mirror, it is difficult to design the observation range and the beam diameter of the laser light entering the objective lens independently of each other. Furthermore, the observation range is inversely proportional to the relay magnifying power of the relay lens from the galvanometer mirror to the pupil position of the objective lens, whereas the beam diameter of the laser light entering the objective lens is proportional to the relay magnifying power of the relay lens from the galvanometer mirror to the pupil position of the objective lens.

Therefore, if the observation range is preferentially ensured, it is not possible to increase the beam diameter to satisfy the pupil diameter of the objective lens, thus making it impossible to sufficiently increase the numerical aperture of the laser light at the focal position of the objective lens, and the resolution is limited. In contrast, if the beam diameter of the laser light entering the objective lens is preferentially increased to a sufficient beam diameter, a sufficient observation range cannot be ensured due to an insufficient swivel angle of the galvanometer mirror.

The present invention provides a scanning optical system and a scanning device that can achieve an expanded observation range without sacrificing resolution.

A first aspect of the present invention provides a scanning optical system including a scanner that deflects laser light from a light source while changing a deflection angle of the laser light; a light splitting unit that is capable of splitting-off the laser light from an optical path of the laser light deflected by the scanner; an optical-path combining unit that is disposed between the light source and the scanner and that causes the laser light split-off by the light splitting unit to travel toward the scanner; and a reentry relay optical system that has 1× relay magnifying power and that is disposed between the light splitting unit and the optical-path combining unit. The reentry relay optical system relays the laser light split-off by the light splitting unit so as to cause the laser light to be incident again on the scanner at the same position as an incident position of the laser light from the light source via the optical-path combining unit.

According to this aspect, the laser light emitted from the light source is deflected by the scanner while the deflection angle of the laser light is changed, and is split-off from the optical path by the light splitting unit. Then, the split-off laser light is relayed by the reentry relay optical system, travels again toward the scanner via the optical-path combining unit, and is deflected again by the scanner at the incident position of the laser light from the light source.

In this case, the laser light relayed by the reentry relay optical system becomes incident again on the scanner at an angle given to the laser light in accordance with the first deflection by the scanner. As a result, the laser light deflected again by the scanner is output while being given an angle that is twice as large as the angle given thereto in accordance with the first deflection.

Consequently, since the observation range being inversely proportional to the relay magnifying power of the relay optical system, and the resolution being proportional to the relay magnifying power of the relay optical system, the laser light can be output at a doubled angle without having to double the swivel angle of the scanner or to reduce the relay magnifying power of the reentry relay optical system to half.

In the above-described aspect, the scanning optical system may further include a polarizing element that is disposed in an optical path between the scanner and the light splitting unit or in an optical path between the optical-path combining unit and the scanner and that changes a polarization direction of the laser light. The light splitting unit and the optical-path combining unit may be polarization beam splitters.

According to this configuration, the polarization direction of laser light to be incident on the light splitting unit after undergoing first deflection by the scanner and the polarization direction of laser light to be incident on the light splitting unit after undergoing second deflection by the scanner are varied from each other by changing the polarization direction using the polarizing element between the scanner and the light splitting unit or by changing the polarization direction using the polarizing element between the optical-path combining unit and the scanner. Therefore, by using a polarization beam splitter as the light splitting unit, the laser light to be returned to the scanner after the first deflection by the scanner and the laser light to be output after the second deflection by the scanner can be readily split from each other.

In the above-described aspect, the scanning optical system may further include a pupil-projection relay optical system capable of relaying the laser light deflected again by the scanner to an objective lens.

According to this configuration, the laser light given a doubled angle by the scanner can be made to directly enter the objective lens.

In the above-described aspect, the scanning optical system may further include a magnification relay optical system that increases a beam diameter of the laser light deflected again by the scanner and relays the laser light to the pupil-projection relay optical system.

As described above, the observation range is inversely proportional to the relay magnifying power of the relay optical system, and the resolution is proportional to the relay magnifying power of the relay optical system. With this configuration, although the laser light deflected again by the scanner so as to be given an angle twice as large as the angle given thereto in accordance with the first deflection is relayed by the pupil-projection relay optical system so as to return to the angle inversely proportional to the relay magnifying power of the pupil-projection relay optical system, the beam diameter of the laser light entering the objective lens is increased. Therefore, in this case, the resolution can be improved without sacrificing the observation range.

In the above-described aspect, the scanner may include a first scanner mirror and a second scanner mirror that are swivelable about swivel axes intersecting each other and that are disposed adjacent to each other. Alternatively, the scanner may include a first scanner mirror and a second scanner mirror that are swivelable about swivel axes intersecting each other and that are disposed adjacent to each other, and the scanning optical system may further include an inter-scanner-mirror relay optical system that is disposed between the first scanner mirror and the second scanner mirror and that relays laser light deflected by the first scanner mirror to the second scanner mirror.

According to these configurations, the laser light can be scanned two-dimensionally by using the first scanner mirror and the second scanner mirror.

A second aspect of the present invention provides a scanning device including two scanning optical systems described above and an inter-scanner relay optical system disposed between the two scanning optical systems. The scanner in one of the scanning optical systems is a first scanner that deflects the laser light in a first direction. The scanner in the other scanning optical system is a second scanner that deflects the laser light in a second direction orthogonal to the first direction. The inter-scanner relay optical system relays the laser light deflected by the first scanner to the second scanner.

According to this aspect, the two scanning optical systems can output the laser light after doubling the angle thereof in each of the first direction and the second direction that intersect each other. Therefore, the observation range can be expanded without sacrificing time and resolution.

The present invention is advantageous in that it can achieve an expanded observation range without sacrificing resolution.

DESCRIPTION OF EMBODIMENTS

First Embodiment

A scanning optical system according to a first embodiment of the present invention will be described below with reference to the drawings.

Figure 1:
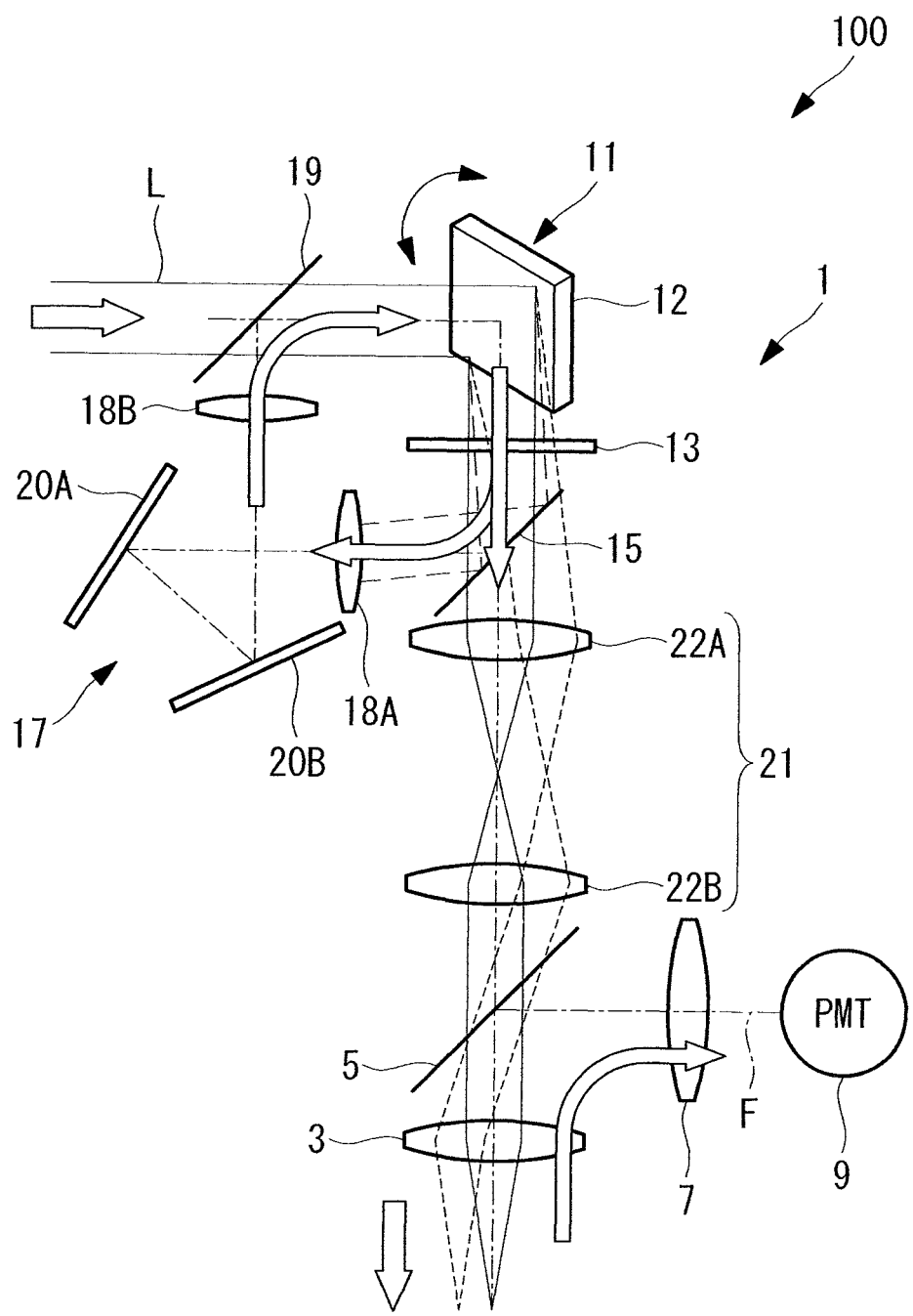
FIG. 1 illustrates the overall configuration of a microscope apparatus provided with a scanning optical system according to a first embodiment of the present invention.

As shown in FIG. 1, a scanning optical system 1 according to this embodiment is provided in a microscope apparatus 100. The microscope apparatus 100 includes the scanning optical system 1 that scans IR laser light L (simply referred to as "laser light L" hereinafter) emitted from a light source (not shown), an objective lens 3 that radiates the laser light L scanned by the scanning optical system 1 onto a sample (not shown) and collects fluorescence F generated in the sample, a dichroic mirror 5 that splits-off the fluorescence F collected by the objective lens 3 from the optical path of the laser light L, a focusing lens 7 that focuses the fluorescence F split-off by the dichroic mirror 5, and a photodetector 9 that detects the fluorescence F focused by the focusing lens 7.

The light source emits, for example, p-polarized laser light L.

Figure 2:
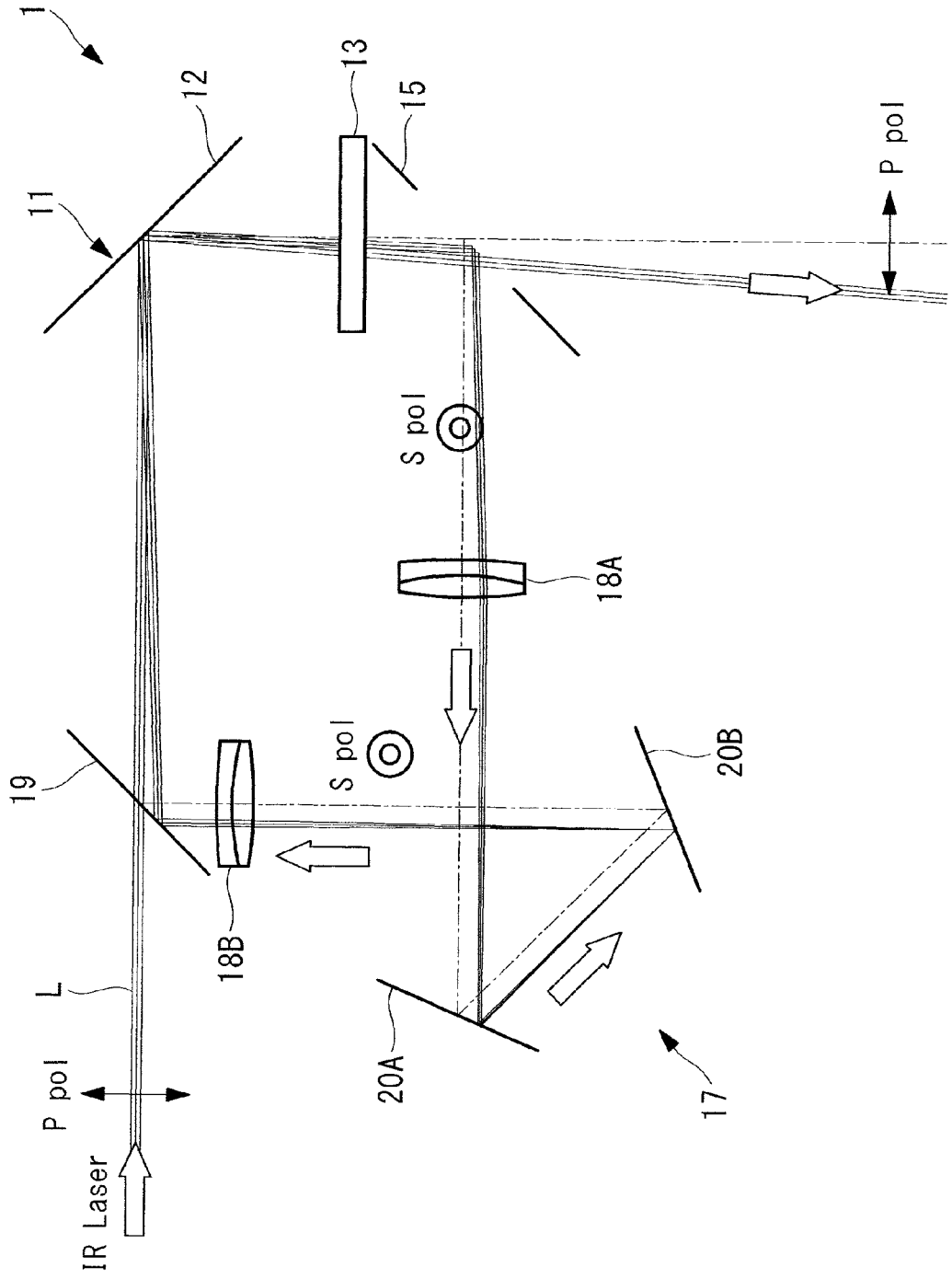
FIG. 2 schematically illustrates the configuration of the scanning optical system in FIG. 1.

As shown in FIGS. 1 and 2, the scanning optical system 1 includes a scanner 11 that deflects the laser light L from the light source while changing the deflection angle thereof, a half-wave plate (polarizing element) 13 that changes the polarization direction of the laser light L deflected by the scanner 11, a polarization beam splitter (light splitting unit) 15 capable of splitting-off the laser light L that has passed through the half-wave plate 13 from the optical path of the laser light L traveling toward the objective lens 3, a first relay optical system (reentry relay optical system) 17 that relays the laser light L split-off by the polarization beam splitter 15, a polarization beam splitter (optical-path combining unit) 19 that reflects the laser light L relayed by the first relay optical system 17 toward the scanner 11, and a second relay optical system (pupil-projection relay optical system) 21 that relays the laser light L reflected by the polarization beam splitter 19 and deflected again by the scanner 11 to the objective lens 3.

The scanner 11 includes, for example, two galvanometer mirrors 12 (i.e., a first scanner mirror and a second scanner mirror, only one of which is shown), which are adjacent galvanometer mirrors that swivel about nonparallel axes. The two galvanometer mirrors 12 are disposed adjacent to each other in the optical path of the laser light. With a suitable combination of the swivel angles of the galvanometer mirrors 12, the scanner 11 is capable of scanning the laser light L two-dimensionally in the X direction and the Y direction, which are orthogonal to each other.

If the incoming laser light L is in a p-polarized state, the half-wave plate 13 converts the laser light L into s-polarized light and outputs the light. If the incoming laser light is in an s-polarized state, the half-wave plate 13 converts the laser light L into p-polarized light and outputs the light.

The polarization beam splitter 15 is disposed at an angle of 45° relative to the optical axis of the objective lens 3. This polarization beam splitter 15 reflects s-polarized laser light L from the half-wave plate 13 so as to make the laser light L turn back toward the light source along an optical path extending substantially parallel to the optical axis of the light source, or transmits p-polarized laser light L from the half-wave plate 13 toward the objective lens 3.

The first relay optical system 17 includes a pair consisting of a first lens 18A and a second lens 18B disposed with a certain distance therebetween in the optical-axis direction and a mirror 20A and a mirror 20B disposed between the first lens 18A and the second lens 18B. The first relay optical system 17 has 1× relay magnifying power, and the first lens 18A and the second lens 18B have identical focal lengths (FL).

The first lens 18A is disposed in an optical path extending parallel to the optical axis of the light source and is configured to focus the laser light L from the polarization beam splitter 15 and cause the laser light L to be incident on the mirror 20A. The mirror 20A reflects the laser light L from the first lens 18A toward the mirror 20B, and the mirror 20B reflects the laser light L from the mirror 20A toward the second lens 18B. The second lens 18B is disposed in an optical path extending orthogonally to the optical axis of the light source and is configured to convert the laser light L from the mirror 20B into collimated light and to cause the laser light L to be incident on the polarization beam splitter 19.

The polarization beam splitter 19 is disposed at an angle of 45° relative to the optical axis of the light source. The polarization beam splitter 19 transmits p-polarized laser light L from the light source toward the scanner 11 and reflects s-polarized laser light L from the first relay optical system 17 toward the scanner 11.

The first relay optical system 17 relays the laser light L split-off by the polarization beam splitter 15 with 1× relay magnifying power and can cause the laser light L to be incident again on the scanner 11 at the same position as the incident position of the laser light L from the light source via the polarization beam splitter 19.

As shown in FIG. 1, the second relay optical system 21 includes a pair consisting of a first lens 22A and a second lens 22B disposed with a certain distance therebetween in the optical-axis direction. A rear focal position of the first lens 22A located closer toward the scanner 11 is aligned with a front focal position of the second lens 22B located farther away from the scanner 11. The second relay optical system 21 focuses incoming laser light L, which is in the form of substantially collimated light, and subsequently outputs the laser light L in the form of substantially collimated light.

The dichroic mirror 5 is disposed adjacent to the objective lens 3 at the rear side thereof at an angle of 45° relative to the optical axis of the objective lens 3. The dichroic mirror 5 has transmission properties that transmit the laser light L and reflect the fluorescence F. Thus, the laser light L from the light source is transmitted through the dichroic mirror 5 and enters the objective lens 3, whereas the fluorescence F collected by the objective lens 3 is deflected by 90° by the dichroic mirror 5, is focused by the focusing lens 7, and is detected by the photodetector 9.

The photodetector 9 is, for example, a photomultiplier tube. The scan positions of the laser light L scanned by the scanner 11 and the intensities of the fluorescence F generated as a result of the laser light L being radiated onto the scan position are stored in association with each other so that a two-dimensional image of the fluorescence F can be acquired.

The operation of the microscope apparatus 100 according to this embodiment having the above-described configuration will be described below.

In order to perform fluorescence observation with respect to a sample by using the microscope apparatus 100 according to this embodiment, p-polarized laser light L is generated from the light source and is made to enter the scanning optical system 1, as shown in FIGS. 1 and 2. The p-polarized laser light L entering the scanning optical system 1 is transmitted through the polarization beam splitter 19, is deflected by the scanner 11, is converted into s-polarized light by the half-wave plate 13, and is reflected by the polarization beam splitter 15.

The s-polarized laser light L reflected by the polarization beam splitter 15 is relayed by the first relay optical system 17, is reflected by the polarization beam splitter 19, and becomes incident again on the scanner 11 at the same position as the first incident position so as to be deflected again. The swivel angle of the scanner 11 is the same for both the first deflection and the second deflection of the laser light L. Specifically, in a state where the swivel angle of the scanner 11 is the same, the laser light L becomes incident twice on the same incident position in the scanner 11 so as to be repeatedly deflected.

The laser light L deflected twice by the scanner 11 is converted into p-polarized light by the half-wave plate 13 and is transmitted through the polarization beam splitter 15. The laser light L transmitted through the polarization beam splitter 15 is relayed by the second relay optical system 21, is transmitted through the dichroic mirror 5, and is focused onto the sample by the objective lens 3. Thus, the material of the fluorescence F existing within the sample is excited in accordance with a multiphoton excitation effect at the focal position of the laser light L, whereby fluorescence F is generated.

The fluorescence F generated in the sample is collected by the objective lens 3, is reflected by the dichroic mirror 5, is focused by the focusing lens 7, and is detected by the photodetector 9. The scan position of the laser light L scanned by the scanner 11 and the intensity of the fluorescence F detected by the photodetector 9 are stored in association with each other so that a fluorescence image can be acquired.

In this case, as shown in FIG. 2, the laser light L after the first deflection by the scanner 11 is given an angle according to the deflection angle relative to the optical axis of the objective lens 3 as a result of the first deflection by the scanner 11. Thus, the laser light L split-off by the polarization beam splitter 15 and relayed by the first relay optical system 17 becomes incident on the same incident position in the scanner 11, which is set at the same swivel angle as that for the first deflection, at an incident angle equal to the first output angle from the scanner 11. Therefore, the laser light L deflected again by the scanner 11 is output therefrom while being given an angle twice as large as the angle according to the first deflection relative to the optical axis of the objective lens 3.

Figure 3:
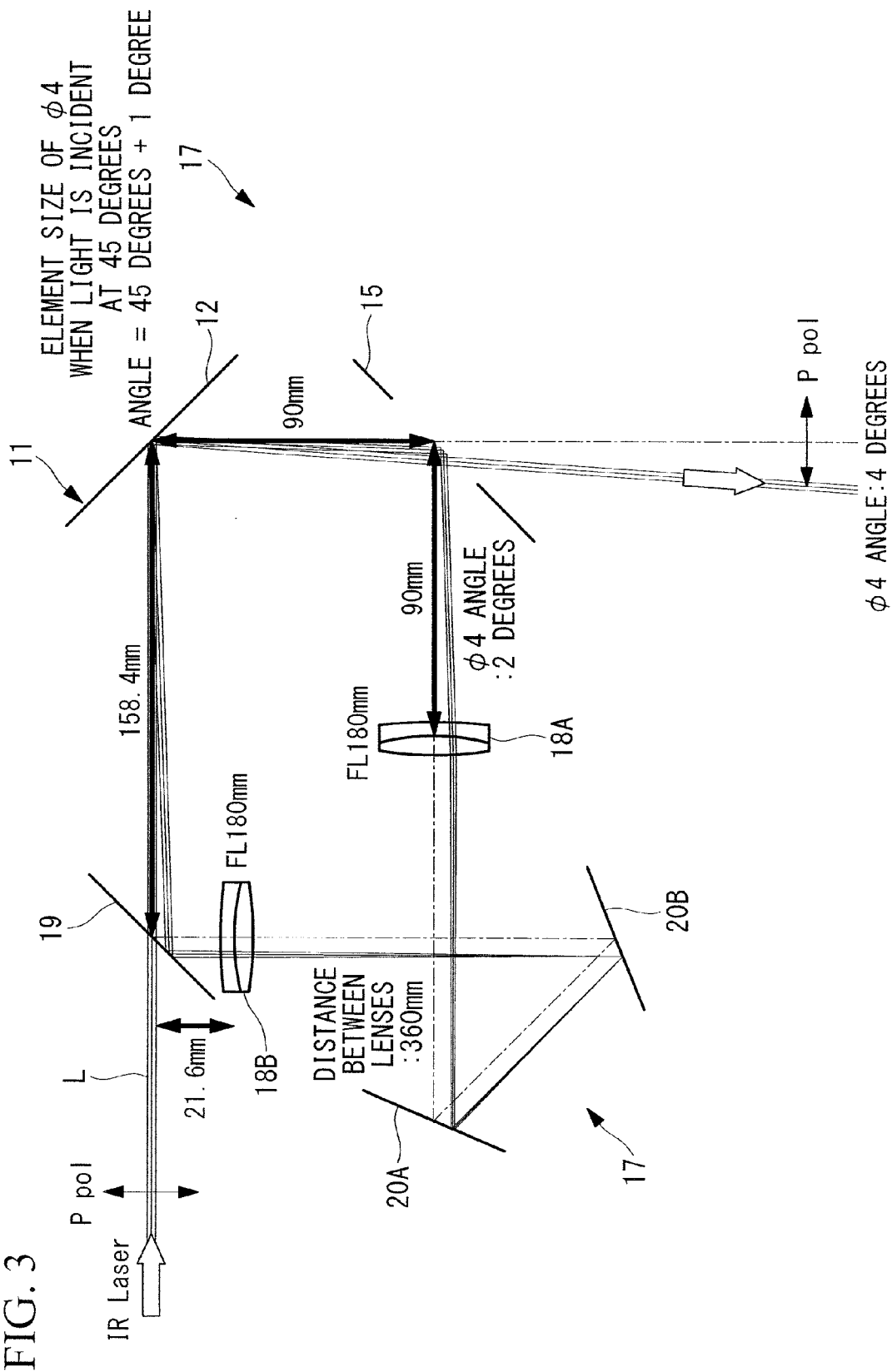
FIG. 3 schematically illustrates the configuration of an example of the scanning optical system in FIG. 2.

For example, as shown in FIG. 3, in a case where laser light is output while being given an angle of 2° relative to the optical axis of the objective lens 3 in accordance with first deflection by the scanner 11, the first relay optical system 17 causes the laser light to be incident again on the scanner 11 at the same position as the first incident position so that the laser light is deflected again. Thus, the laser light is output while being given an angle of 4°, which is twice as large as the angle given thereto in accordance with the first deflection, relative to the optical axis of the objective lens 3.

Figure 4:
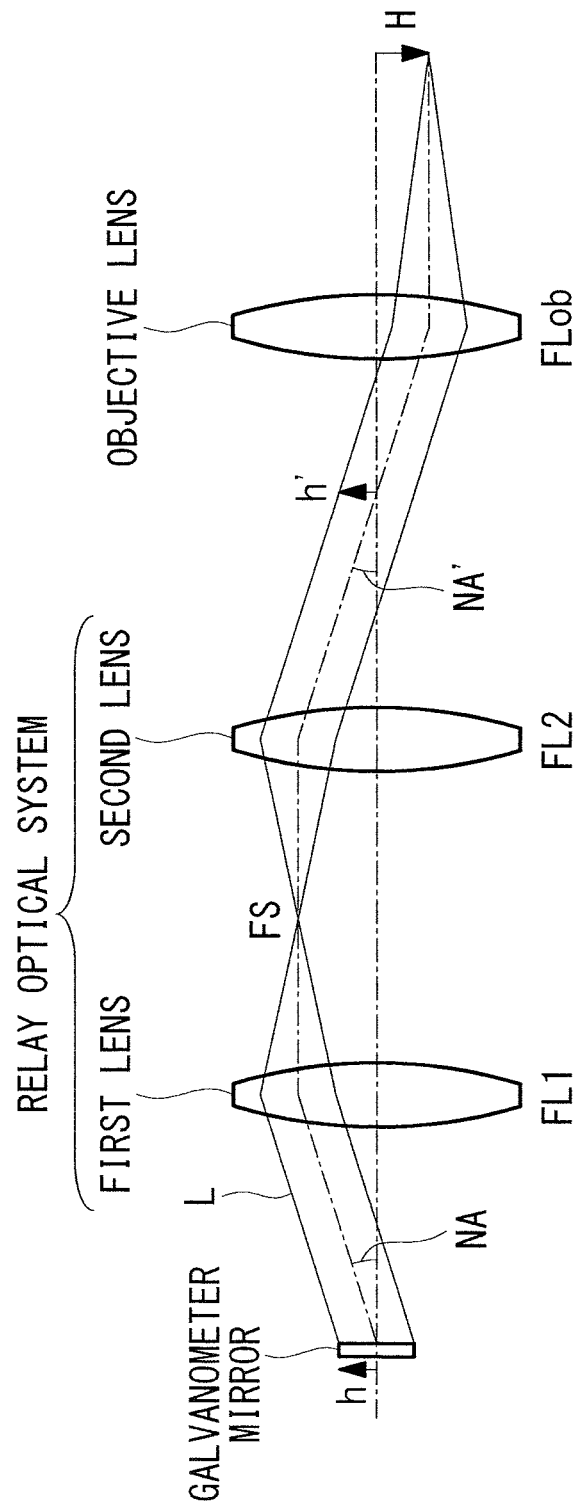
FIG. 4 illustrates the configuration of an illumination optical system of a typical laser scanning microscope.

As shown in FIG. 4, the relay magnifying power (MG) of a relay optical system is determined in accordance with the following equation:

$$MG=FL2/FL1$$

where FL1 denotes the focal length of a first lens of the relay optical system, and FL2 denotes the focal length of a second lens of the relay optical system.

The radius (h') of the beam waist of a light beam entering an objective lens is determined in accordance with the following equation:

$$h'=h \times MG$$

where h denotes the radius of the beam waist of a light beam to be output from a galvanometer mirror and is normally set to a value slightly smaller than the size of the galvanometer mirror. If the beam diameter of a light beam to be incident on the galvanometer mirror is larger than the size of the galvanometer mirror, h is equal to the height of the galvanometer mirror.

Normally, the relay magnifying power (MG) is preferably set to a desired value that allows a light beam entering the objective lens to satisfy the pupil diameter of the objective lens so that the objective lens can exhibit its full resolving power.

Furthermore, a radiation position (H) of laser light is determined in accordance with the following equation:

$$H=NA' \times FL_{ob}=(NA/MG) \times FL_{ob}$$

where NA and NA' each denote the angle of the light beam, and $FL_{ob}$ denotes the focal length of the objective lens.

As derived from these equations, the observation range is inversely proportional to the relay magnifying power of the relay optical system, and the resolution is proportional to the relay magnifying power of the relay optical system.

Another conceivable method for increasing the beam waist (h') of the light beam entering the objective lens involves increasing the size of the galvanometer mirror to increase the radius of the beam waist of the light beam to be output from the galvanometer mirror. However, as the galvanometer mirror increases in size, the swiveling operation slows down, thus leading to a longer scanning time.

In the scanning optical system 1 according to this embodiment, the laser light L is deflected two consecutive times at the same incident position in the scanner 11 set at the same swivel angle so that the angle of the laser light L that is to enter the objective lens 3 can be doubled without having to double the swivel angle of the scanner 11 or to reduce the relay magnifying power of the second relay optical system 21 to half.

Therefore, in the scanning optical system 1 according to this embodiment, the observation range can be expanded without having to increase the swivel angle of the scanner 11 and sacrifice the scanning time or without having to reduce the relay magnifying power of a relay optical system and sacrifice the resolution. Furthermore, in the microscope apparatus 100 according to this embodiment, an image of a sample can be acquired with an expanded observation range without sacrificing the resolution by using the above-described scanning optical system 1.

Second Embodiment

Next, a scanning optical system according to a second embodiment of the present invention will be described.

Figure 5:
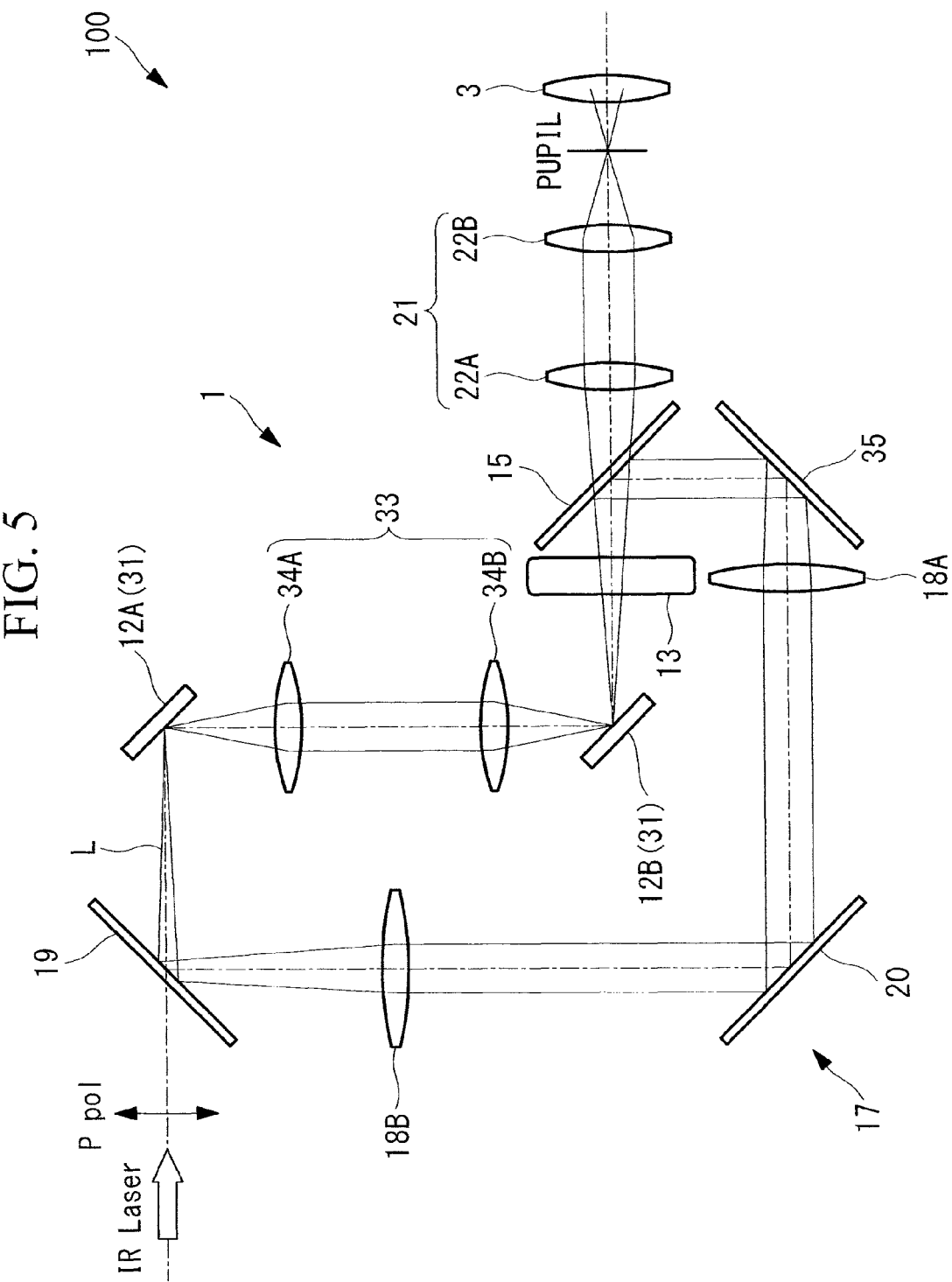
FIG. 5 illustrates the overall configuration of a microscope apparatus provided with a scanning optical system according to a second embodiment of the present invention.

As shown in FIG. 5, a microscope apparatus 100 according to this embodiment is different from that in the first embodiment in that a scanning optical system 1 includes a scanner 31 in place of the scanner 11 having adjacent galvanometer mirrors. Specifically, the scanner 31 is constituted of an X galvanometer mirror (first scanner mirror) 12A and a Y galvanometer mirror (second scanner mirror) 12B that are disposed with a certain distance therebetween in the optical-axis direction.

In the following description, sections identical to those in the scanning optical system 1 and the microscope apparatus 100 according to the first embodiment will be given the same reference signs, and descriptions thereof will be omitted.

The scanning optical system 1 according to this embodiment includes the scanner 31, a relay optical system (inter-scanner-mirror relay optical system) 33 disposed on an optical axis between the X galvanometer mirror 12A and the Y galvanometer mirror 12B in the scanner 31, a half-wave plate 13, a polarization beam splitter 15, a mirror 35 that reflects laser light L split-off by the polarization beam splitter 15, a first relay optical system 17, a polarization beam splitter 19, and a second relay optical system 21.

The X galvanometer mirror 12A deflects the laser light L in the X direction while changing the polarization angle thereof, and the Y galvanometer mirror 12B deflects the laser light L in the Y direction while changing the polarization angle thereof. The X galvanometer mirror 12A and the Y galvanometer mirror 12B are both disposed at conjugate positions with respect to the pupil of the objective lens 3.

The relay optical system 33 includes a pair consisting of a first lens 34A and a second lens 34B disposed with a certain distance therebetween in the optical-axis direction. The relay optical system 33 has 1× relay magnifying power, and the first lens 34A and the second lens 34B have identical focal lengths.

The first relay optical system 17 includes a first lens 18A, a second lens 18B, and a mirror 20 disposed between the first lens 18A and the second lens 18B. The first lens 18A focuses the laser light L from the mirror 35 and causes the laser light L to be incident on the mirror 20. The mirror 20 reflects the laser light L from the first lens 18A toward the second lens 18B. The second lens 18B converts the laser light L from the mirror 20 into collimated light and causes the collimated light to be incident on the polarization beam splitter 19.

The operation of the microscope apparatus 100 according to this embodiment having the above-described configuration will be described below.

In order to observe a sample by using the microscope apparatus 100 according to this embodiment, p-polarized laser light L is generated from the light source and is made to enter the scanning optical system 1. The p-polarized laser light L entering the scanning optical system 1 is transmitted through the polarization beam splitter 19, is deflected in the X direction by the X galvanometer mirror 12A, is relayed by the relay optical system 33, and is deflected in the Y direction by the Y galvanometer mirror 12B.

The laser light L deflected by the Y galvanometer mirror 12B is converted into s-polarized light by the half-wave plate 13, is reflected by the polarization beam splitter 15, is relayed by the first relay optical system 17 via the mirror 35, and is reflected toward the X galvanometer mirror 12A by the polarization beam splitter 19.

The laser light L reflected by the polarization beam splitter 19 becomes incident again on the X galvanometer mirror 12A, which is set at the same swivel angle as that for the first deflection, at the same position as the first incident position so as to be deflected again in the X direction. Then, the laser light L is relayed by the relay optical system 33 and becomes incident again on the Y galvanometer mirror 12B, which is set at the same swivel angle as that for the first deflection, at the same position as the first incident position so as to be deflected again in the Y direction.

The laser light L deflected again by the Y galvanometer mirror 12B is converted into p-polarized light by the half-wave plate 13, is transmitted through the polarization beam splitter 15, is relayed by the second relay optical system 21, and is focused onto the sample by the objective lens 3. Fluorescence F generated in the sample is collected by the objective lens 3, is reflected by a dichroic mirror (not shown), is focused by a focusing lens (not shown), and is detected by a photodetector (not shown).

Figure 6:
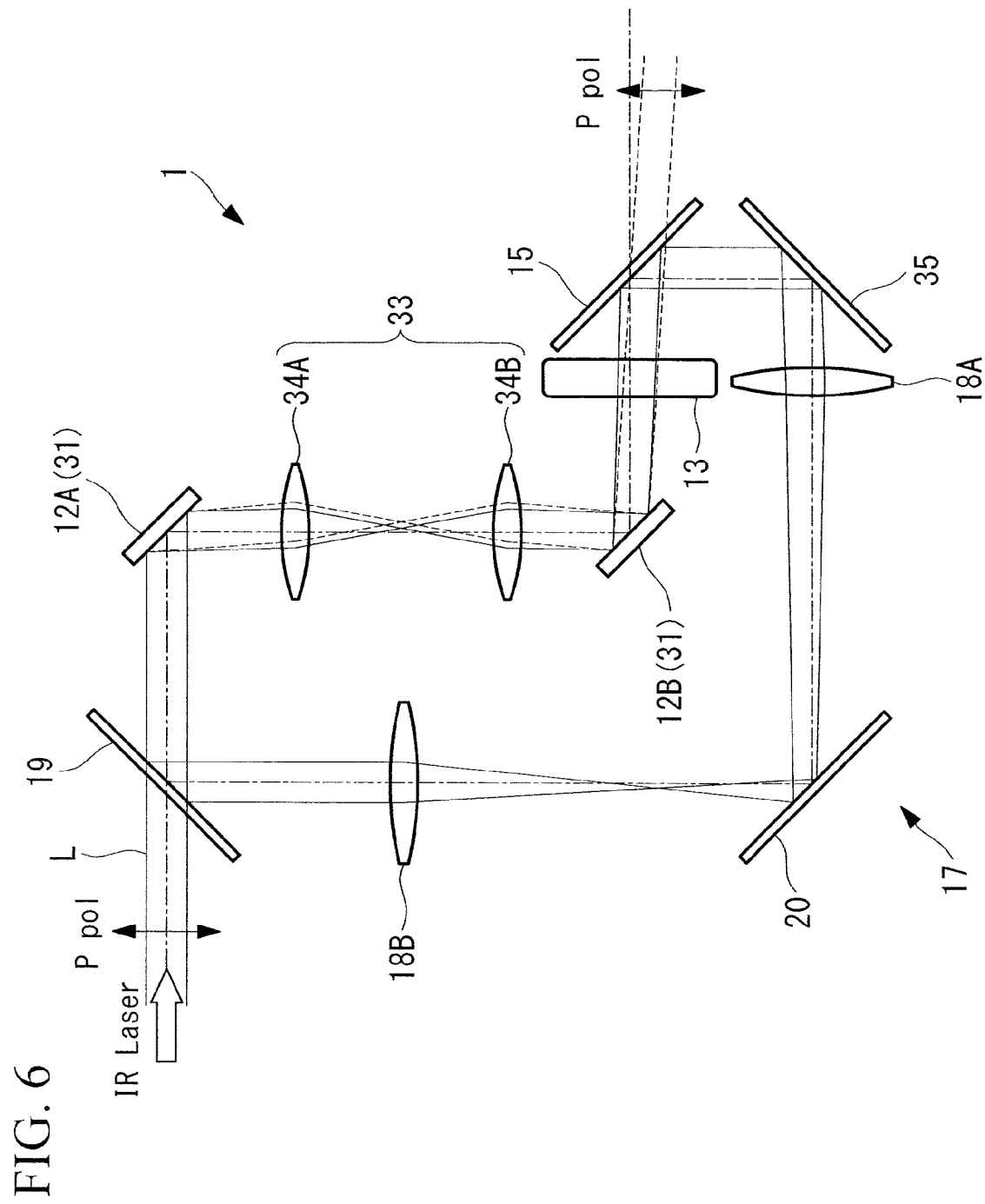
FIG. 6 schematically illustrates the configuration of the scanning optical system according to the second embodiment of the present invention.

In this case, as shown in FIG. 6, the laser light L after the first deflection by the X galvanometer mirror 12A and the Y galvanometer mirror 12B is given an angle according to the deflection angles in the X direction and the Y direction relative to the optical axis of the objective lens 3 as a result of the first deflection by the galvanometer mirrors 12A and 12B. The laser light L split-off by the polarization beam splitter 15 and relayed by the first relay optical system 17 becomes incident on the same incident positions in the galvanometer mirrors 12A and 12B, which are set at the same swivel angles as those for the first deflection, at incident angles equal to the first output angles from the galvanometer mirrors 12A and 12B. Therefore, the laser light L deflected again by the galvanometer mirrors 12A and 12B is output therefrom while being given an angle twice as large as the angle according to the first deflection in the X direction and the Y direction relative to the optical axis of the objective lens 3.

In the scanning optical system 1 according to this embodiment, the observation range can be expanded without having to increase the swivel angles of the galvanometer mirrors 12A and 12B and sacrifice the scanning time or without having to reduce the relay magnifying power of a relay optical system and sacrifice the resolution. Furthermore, in the microscope apparatus 100 according to this embodiment, an image of a sample can be acquired with an expanded observation range without sacrificing the resolution by using the above-described scanning optical system 1.

The above-described embodiments can be modified as follows.

Figure 7:
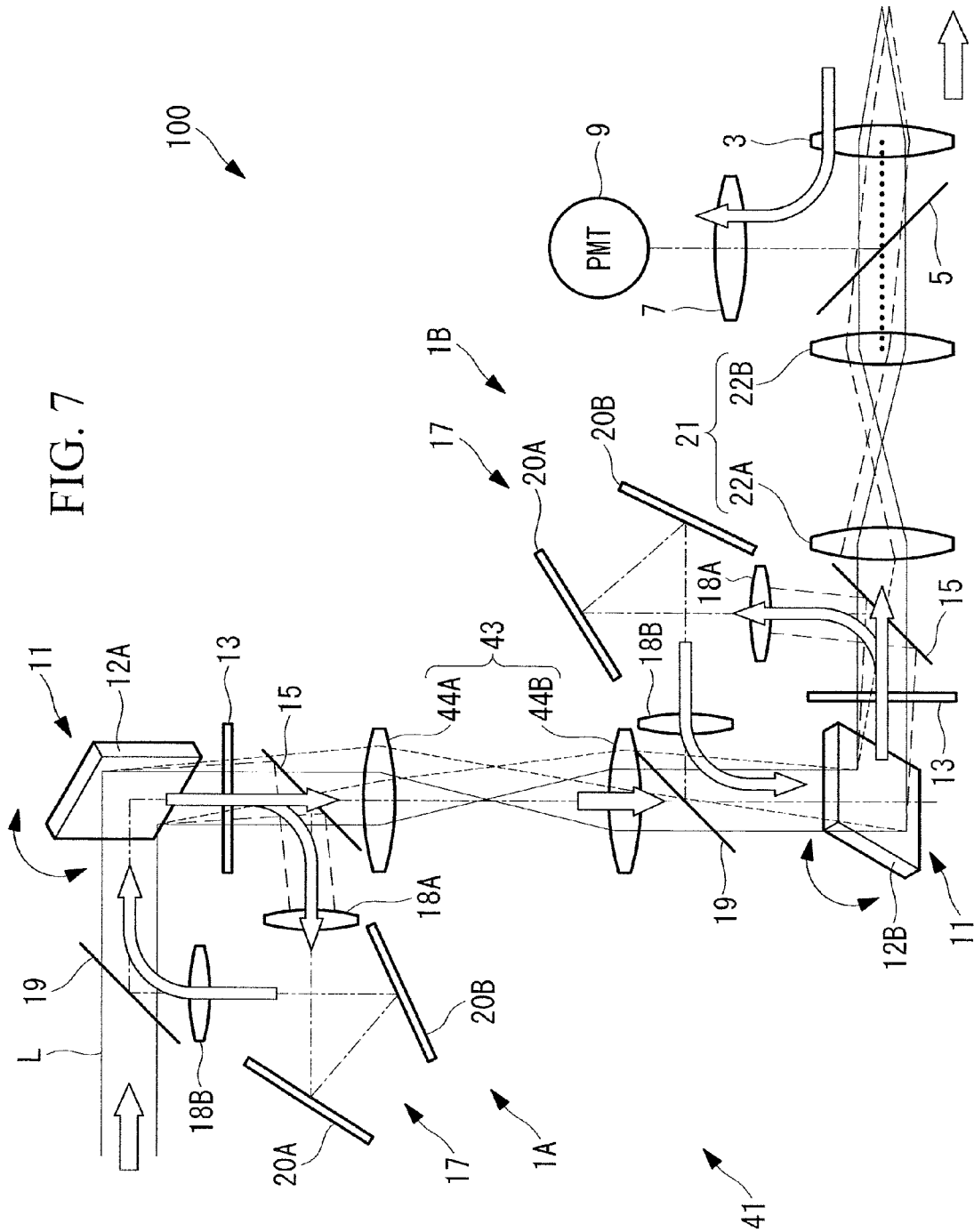
FIG. 7 illustrates the overall configuration of a microscope apparatus provided with a scanning device according to a first modification of each embodiment of the present invention.

As shown in FIG. 7, as a first modification, two scanning optical systems 1 (which will be defined as scanning optical systems 1A and 1B) according to the first embodiment may be arranged in series with a certain distance therebetween in the optical-axis direction. Furthermore, a scanning device 41 may be configured by using the X galvanometer mirror 12A as the scanner (first scanner) 11 in the scanning optical system 1A and by using the Y galvanometer mirror 12B as the scanner (second scanner) 11 in the other scanning optical system 1B.

The scanning device 41 may include a relay optical system (inter-scanner relay optical system) 43 that relays laser light deflected by the X galvanometer mirror 12A in the scanning optical system 1A to the Y galvanometer mirror 12B in the other scanning optical system 1B. The X galvanometer mirror 12A and the Y galvanometer mirror 12B may be disposed at conjugate positions with respect to the pupil of the objective lens 3. The relay optical system 43 has 1× relay magnifying power and includes a pair consisting of a first lens 44A and a second lens 44B that are disposed with a certain distance therebetween in the optical-axis direction and that have identical focal lengths.

According to this modification, laser light L emitted from the light source is output from the scanning optical system 1A while being deflected twice at the same incident position by the X galvanometer mirror 12A set at the same swivel angle. Moreover, the laser light L is output from the scanning optical system 1B while being deflected twice at the same incident position by the Y galvanometer mirror 12B set at the same swivel angle. Then, the laser light L is transmitted through the dichroic mirror 5 and is radiated onto the sample by the objective lens 3.

In this modification, the angle of the laser light L that is to enter the objective lens 3 can be doubled without having to double the swivel angles of the galvanometer mirrors 12A and 12B or to reduce the relay magnifying power of the relay optical system to half. Therefore, the observation range can be expanded without sacrificing time and resolution.

Figure 8:
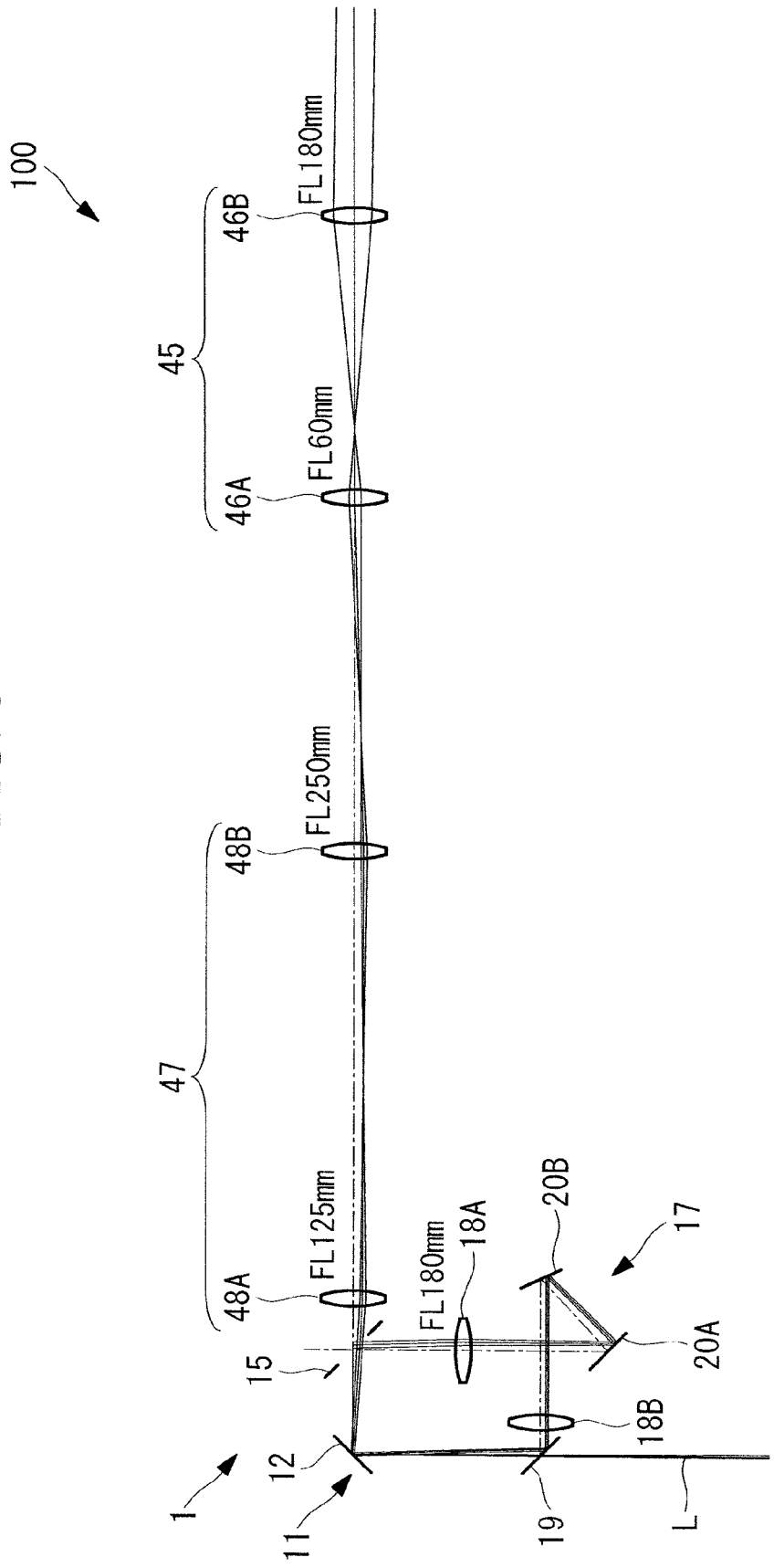
FIG. 8 illustrates the overall configuration of a microscope apparatus provided with a scanning optical system according to a second modification of each embodiment of the present invention.

As shown in FIG. 8, as a second modification, a relay optical system (magnification relay optical system) 47 having 2× relay magnifying power may be provided between the polarization beam splitter 15 and a second relay optical system (pupil-projection optical system) 45.

In the relay optical system 47, for example, a first lens 48A with a focal length (FL) of 125 mm and a second lens 48B with a focal length (FL) of 250 mm are disposed with a certain distance therebetween in the axial direction. This relay optical system 47 relays laser light L deflected twice by the scanner 11 and transmitted through the polarization beam splitter 15 to the second relay optical system 45. In the second relay optical system 45, for example, a first lens 46A with a focal length (FL) of 60 mm and a second lens 46B with a focal length (FL) of 180 mm are disposed with a certain distance therebetween in the axial direction.

According to this modification, since the observation range is inversely proportional to the relay magnifying power of the relay optical system, and the resolution is proportional to the relay magnifying power of the relay optical system, the laser light L deflected twice at the same incident position in the scanner 11 so as to be given an angle twice as large as the angle according to the first deflection relative to the optical axis of the objective lens 3 is relayed by the third relay optical system 47 having 2× relay magnifying power. Thus, although the angle at which the laser light enters the objective lens returns to the angle according to the first deflection, the beam diameter of the laser light entering the objective lens is doubled. Therefore, in this case, the resolution can be improved without sacrificing the observation range.

Although the embodiments of the present invention have been described above in detail with reference to the drawings, specific configurations are not limited to these embodiments and include, for example, design alterations so long as they do not deviate from the scope of the invention. For example, the present invention is not limited to the above-described embodiments and modifications. The present invention is not particularly limited and may be applied to embodiments obtained by appropriately combining these embodiments and modifications. For example, although the scanner includes the galvanometer mirrors 12 or 12A and 12B as the scanner mirrors in each of the above-described embodiments, for example, resonant scanner mirrors may be used as the scanner mirrors in place of the galvanometer mirrors.

REFERENCE SIGNS LIST 1, 1A, 1B scanning optical system
3 objective lens 11, 31 scanner
12 galvanometer mirrors (first scanner mirror and second scanner mirror)
12A X galvanometer mirror (first scanner mirror)
12B Y galvanometer mirror (second scanner mirror)
13 half-wave plate (polarizing element)
15 polarization beam splitter (light splitting unit)
17 first relay optical system (reentry relay optical system)
19 polarization beam splitter (optical-path combining unit)
21, 45 second relay optical system (pupil-projection replay optical system)
33 relay optical system (inter-scanner-mirror relay optical system)
43 relay optical system (inter-scanner relay optical system)
47 relay optical system (magnification relay optical system)

The invention claimed is:

1. A scanning optical system comprising:
a scanner that deflects laser light from a light source while changing a deflection angle of the laser light;
a light splitting unit that is capable of splitting-off the laser light from an optical path of the laser light deflected by the scanner;
an optical-path combining unit that is disposed between the light source and the scanner and that causes the laser light split-off by the light splitting unit to travel toward the scanner; and
a reentry relay optical system that has one time magnifying power and that is disposed between the light splitting unit and the optical-path combining unit, the reentry relay optical system relaying the laser light split-off by the light splitting unit so as to cause the laser light to be incident again on the scanner at the same position as an incident position of the laser light from the light source via the optical-path combining unit.

2. The scanning optical system according to claim 1, further comprising:
a polarizing element that is disposed in an optical path between the scanner and the light splitting unit or in an optical path between the optical-path combining unit and the scanner and that changes a polarization direction of the laser light,
wherein the light splitting unit and the optical-path combining unit are polarization beam splitters.

3. The scanning optical system according to claim 1, further comprising:
a pupil-projection relay optical system capable of relaying the laser light deflected again by the scanner to an objective lens.

4. The scanning optical system according to claim 3, further comprising:
a magnification relay optical system that increases a beam diameter of the laser light deflected again by the scanner and relays the laser light to the pupil-projection relay optical system.

5. The scanning optical system according to claim 1, wherein the scanner includes a first scanner mirror and a second scanner mirror that are swivelable about swivel axes intersecting each other and that are disposed adjacent to each other.

6. The scanning optical system according to claim 1, wherein the scanner includes a first scanner mirror and a second scanner mirror that are swivelable about swivel axes intersecting each other and that are disposed adjacent to each other, and
wherein the scanning optical system further comprises an inter-scanner-mirror relay optical system that is disposed between the first scanner mirror and the second scanner mirror and that relays laser light deflected by the first scanner mirror to the second scanner mirror.

7. A scanning device comprising:
two scanning optical systems according to claim 1; and
an inter-scanner relay optical system disposed between the two scanning optical systems,
wherein the scanner in one of the scanning optical systems is a first scanner that deflects the laser light in a first direction,
wherein the scanner in the other scanning optical system is a second scanner that deflects the laser light in a second direction orthogonal to the first direction, and
wherein the inter-scanner relay optical system relays the laser light deflected by the first scanner to the second scanner.

* * * * *